United States Patent
Pellar

(10) Patent No.: US 7,656,414 B2
(45) Date of Patent: Feb. 2, 2010

(54) SYSTEM AND METHOD FOR DETERMINATION OF GRAY FOR CIE COLOR CONVERSION USING CHROMATICITY

(75) Inventor: Ronald J. Pellar, Orange, CA (US)

(73) Assignees: Kabushiki Kaisha Toshiba (JP); Toshiba Tech Kabushiki Kaisha (JP)

( * ) Notice: Subject to any disclaimer, the term of this patent is extended or adjusted under 35 U.S.C. 154(b) by 483 days.

(21) Appl. No.: 11/399,041

(22) Filed: Apr. 6, 2006

(65) Prior Publication Data

US 2007/0236737 A1    Oct. 11, 2007

(51) Int. Cl.
*G09G 5/02* (2006.01)
*G06F 15/00* (2006.01)
*G06K 15/02* (2006.01)

(52) U.S. Cl. ............... 345/589; 358/1.9
(58) Field of Classification Search ........... 345/600, 345/603, 596, 589; 358/1.9, 2.99, 3.02, 3.03, 358/3.04, 3.07
See application file for complete search history.

(56) References Cited

U.S. PATENT DOCUMENTS

| | | | |
|---|---|---|---|
| 5,402,253 A | | 3/1995 | Seki |
| 6,072,589 A | * | 6/2000 | Rozzi .................... 358/1.9 |
| 6,172,681 B1 | * | 1/2001 | Ueda .................... 345/589 |
| 6,243,059 B1 | * | 6/2001 | Greene et al. ............ 345/88 |
| 6,788,813 B2 | | 9/2004 | Cooper |
| 2002/0131634 A1 | * | 9/2002 | Weibrecht et al. ........ 382/162 |
| 2005/0185200 A1 | | 8/2005 | Tobol |
| 2005/0264837 A1 | | 12/2005 | Shimada |

* cited by examiner

*Primary Examiner*—Ryan R Yang
(74) *Attorney, Agent, or Firm*—Tucker Ellis & West LLP

(57) ABSTRACT

In accordance with the present invention, a system and method are described for producing pure gray tones on a multi-color document output device that includes a system for operating on device independent color data having multiple color components, which color data corresponds to one or more associated electronic documents. The system and method function to extract grayscale data by the use of chromaticity properties of an input image.

18 Claims, 3 Drawing Sheets

SYSTEM AND METHOD FOR DETERMINATION OF GRAY FOR CIE COLOR CONVERSION USING CHROMATICITY

BACKGROUND OF THE INVENTION

The application pertains generally to the art of color image rendering, and more particularly to image rendering which extracts true grayscale values from a color image represented in a multi-dimensional color coordinate scheme. It will be appreciated that the subject application is particularly advantageous in generating renderings of electronic documents, and will be described with particular reference thereto. However, it will be appreciated that the subject system is applicable to any image rendering operation which would benefit by extraction of color information for generation of multi-bit halftone images that correspond to both a pallet of an image file and to rendering capabilities of a document processing device.

Earlier color image rendering systems frequently employ images that are described numerically relative to primary color components. Such color components are suitably additive in nature, such as red-green-blue (RGB), or subtractive, such as cyan, yellow, magenta (CYM), the latter of which is frequently coupled with a black color (K), referred to as CYMK or CYM(K). Many images rendered from such color descriptions include image portions which are gray. Gray objects that are rendered with multiple colors will typically lose edge definition and might have mis-registration artifacts, such as rainbowing. It is recognized that extraction of such gray information for rendering with a single color, such as black, can improve image quality and increase integrity of aspects such as edge generation. Furthermore, it is frequently less expensive and more expeditious to use a single, black color generator to render a gray, rather than multiple blends of color which require additional processing and added ink or toner use. While the preferred embodiment herein corresponds to gray extraction and rendering, it will be appreciated that the concepts disclosed herein are applicable to extraction and rendering of any image component that corresponds to a rendering capability of an associated document processing device.

There are three basic ways that a gray is typically produced on a printer, such as using all four colors on a four color printer, by way of example. A first method employs a composite coloration scheme employing a balance of primaries, such as cyan, magenta and yellow colorants. A second method employs multi-color composites. By way of example, this is suitably comprised of cyan, magenta, yellow and black. A third option is to form a gray coloration solely by use of a single color, typically black. While a four color gray generation approach may provide darker, richer gray values, this is often at a cost of sharpness in edges and lines due to overlaying of the four colors. In a typical system that employs the alternative, black color gray generation, a better edge definition is realized in edges and lines, but at a sacrifice of a production of as dark or rich a gray value. A particular choice as to which technique to use to render grays is frequently dependent on a selected object that is to be rendered, such as text, image, graphic stroke, graphic fill, and the like. Further, practical considerations, such as cost and speed, may govern which method is to be employed for generation of a gray level output.

The concepts disclosed herein are better appreciated with an understanding of numeric models used to represent images, and image colorization, in image processing or rendering applications. CIE L*a*b* (CIELAB or Lab) is frequently thought of one of the most complete color models. It is used conventionally to describe all the colors visible to the human eye. It was developed for this specific purpose by the International Commission on Illumination (Commission Internationale d'Eclairage, resulting in the acronym CIE). The three parameters (L, a, b) in the model represent the luminance of the color (L, L=0 yields black and L=100 indicates white), its position between red and green (a, negative values indicate green, while positive values indicate red) and its position between yellow and blue (b, negative values indicate blue and positive values indicate yellow).

The Lab color model has been created to serve as a device independent reference model. It is therefore important to realize that visual representations of the full gamut of colors in this model are not perfectly accurate, but are used to conceptualize a color space. Since the Lab model is three dimensional, it is represented properly in a three dimensional space. A useful feature of the model is that the first parameter is extremely intuitive: changing its value is like changing the brightness setting in a TV set. Therefore only a few representations of some horizontal "slices" in the model are enough to conceptually visualize the whole gamut, wherein the luminance is suitably represented on a vertical axis.

The Lab model is inherently parameterized correctly. Accordingly, no specific color spaces based on this model are required. CIE 1976 L*a*b* mode is based directly on the CIE 1931 XYZ color space, which sought to define perceptibility of color differences. Circular representations in Lab space corresponded to ellipses in XYZ space. Non-linear relations for L*, a*, and b* are related to a cube root, and are intended to mimic the logarithmic response of the eye. Coloring information is referred to the color of the white point of the system.

One of the first mathematically defined color spaces was the CIE XYZ color space (also known as CIE 1931 color space), created by CIE in 1931. A human eye has receptors for short (S), middle (M), and long (L) wavelengths, also known as blue, green, and red receptors. One need only generate three parameters to describe a color sensation. A specific method for associating three numbers (or tristimulus values) with each color is called a color space, of which the CIE XYZ color space is one of many such spaces. The CIE XYZ color space is based on direct measurements of the human eye, and serves as the basis from which many other color spaces are defined.

In the CIE XYZ color space, tristimulus values are not the S, M and L stimuli of the human eye, but rather a set of tristimulus values called X, Y, and Z, which are also roughly red, green and blue, respectively. Two light sources may be made up of different mixtures of various colors, and yet have the same color (metamerism). If two light sources have the same apparent color, then they will have the same tristimulus values irrespective of what mixture of light was used to produce them.

It would be advantageous to have a system that works on a defined color space, such as the XYZ color space, and extracts grayscale information for rendering on a single color, such as black, referred to herein as a "true gray" rendering.

SUMMARY OF THE INVENTION

In accordance with the present invention, a system and method are described for producing single color or pure gray tones on a multi-color document output device that includes a system for operating on device independent color data having at least three color components, which color data corresponds to one or more associated electronic documents. The system and method function to extract grayscale data from such a device independent color data description in accordance with chromaticity properties of an image description, which grayscale corresponds to a rendering in a single color space. Such resultant data, inclusive of a color data portion and a grayscale portion, is thus completed in device independent form.

In accordance with a more limited aspect of the present invention, there is taught a system for producing single color or pure gray tones by calculating chromaticity data as a function of values of the at least three color components.

In accordance with a more limited aspect of the present invention, there is taught a system for generating the single color gray scale data in accordance with a comparison of chromaticity data and defined chromaticity illuminant data.

In accordance with a more limited aspect of the present invention, there is taught a system for producing gray tones which includes conversion of modified device independent data to that associated with the specified color space corresponding to at least one document processing device.

An advantage of the present invention is the provision of a system by which true gray image aspects may be extracted from an image described in multi-dimension color space.

Another advantage of the present invention is the teaching of a system which accomplishes extraction of true gray color aspects in device independent space.

Yet another advantage is the provision of a image rendering system which provides extraction of true gray color aspects with improved image characteristics.

Still other advantages, aspects and features of the present invention will become readily apparent to those skilled in the art from the following description wherein there is shown and described a preferred embodiment of this invention, simply by way of illustration of one of the best modes best suited for to carry out the invention. As it will be realized, the invention is capable of other different embodiments and its several details are capable of modifications in various obvious aspects all without departing from the scope of the invention. Accordingly, the drawing and descriptions will be regarded as illustrative in nature and not as restrictive.

BRIEF DESCRIPTION OF THE DRAWINGS

The subject invention is described with reference to certain figures, including.

DETAILED DESCRIPTION OF THE PREFERRED EMBODIMENT

Figure 1:
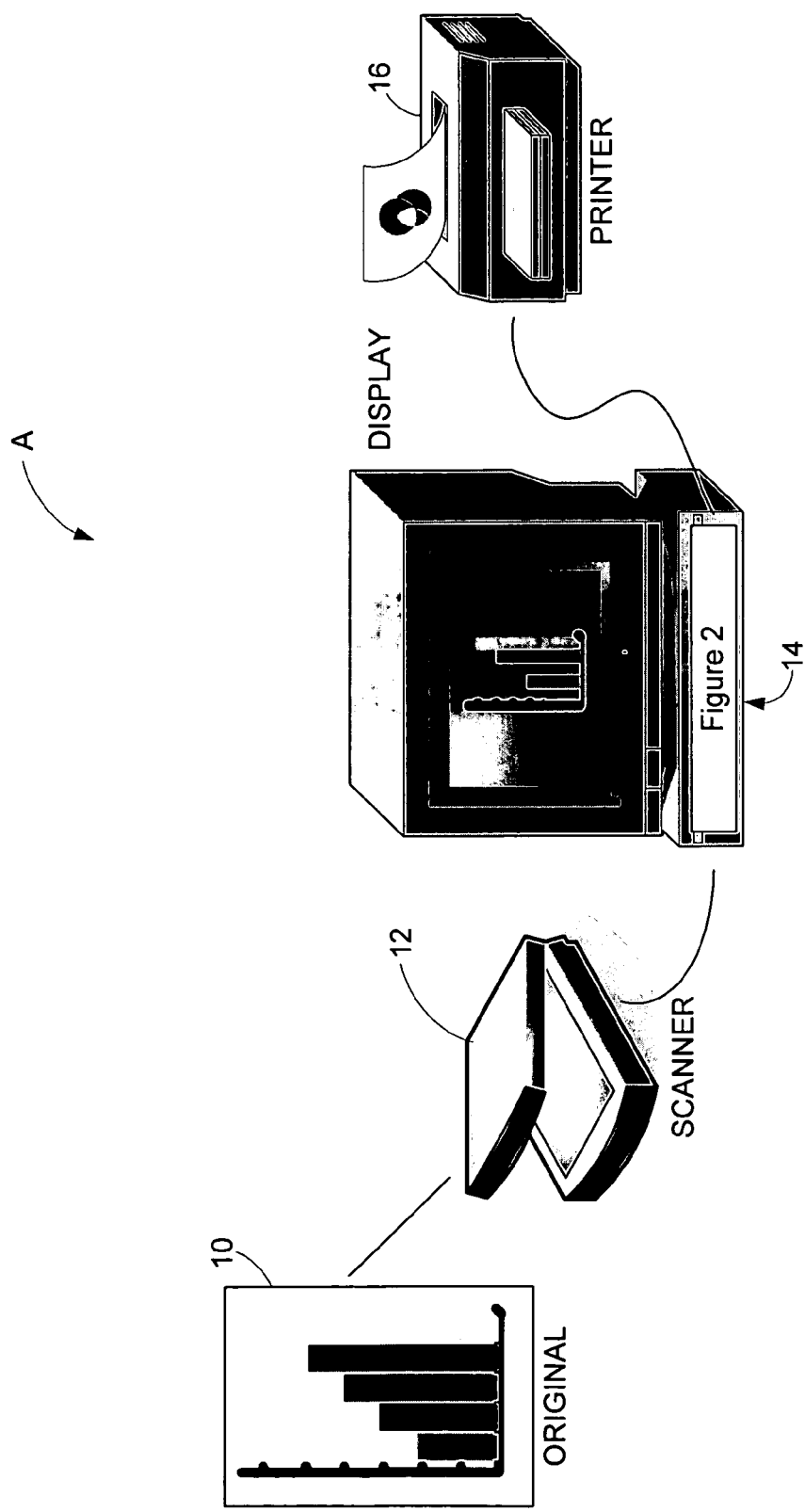
FIG. 1 which is an overall system diagram of a gray extraction and rendering system in connection with the subject invention.

Turning now to the drawings wherein the showings are for purposes illustrated in the preferred embodiment only, and not for the purpose of limiting the same. FIG. 1 illustrates an overall system diagram for the gray scale extraction as contemplated herein.

In FIG. 1, color rendering system A illustrates an original color rendering 10 which is suitably input into a scanning device 12 to form a digital description thereof. A digitized image is communicated to a suitable digital processor, such as illustrated as a computer system 14 that includes gray scale extraction as will be described below. Single color gray scale generation, or black-only neutral coloration, allows for lessened toner pile height, and results in a rendering or generation of text or graphic images that appear sharper and smoother. Additionally, renderings benefit from a reduction of misregistration artifacts on neutral text and graphic stroke objects.

Image data from which gray scale information has been extracted is suitably communicated to an output device, such as printer 16. Although the illustration is made in connection with an input as a scanning device and an output as printer, it is to be appreciated that a suitable digital image will be realized from any suitable input device, such as a digital camera, applications such as a drawing package, or receipt via input from an e-mail or storage device. Conversely, a suitable output can be a plotter, storage, transmission, and the like as will be appreciated by one of ordinary skill in the art.

Figure 2:
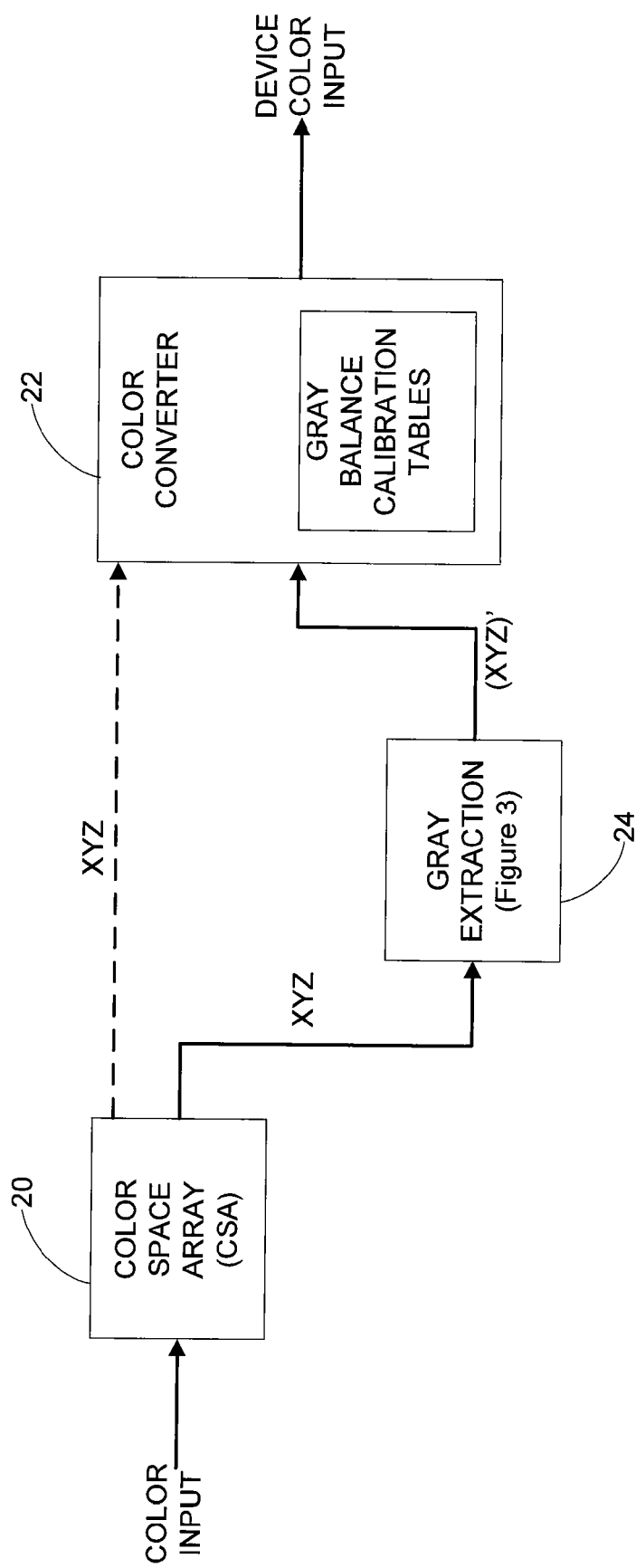
FIG. 2 is a flow diagram relative to gray extraction employed in the subject invention.

Turning now to FIG. 2, illustrated is a block diagram showing conversion suitably completed at the computer system 14 of FIG. 1. In FIG. 2, color input, such as that illustrated by the scanning device 12 of FIG. 1, is communicated to a color space array 20. In a typical conversion, a color-rendering path, such as used in an image path of the PostScript specification, data from the color space array is communicated directly to a color converter 22. In the example of a PostScript conversion, a color conversion in color converter 22 is typically accomplished with a color rendering dictionary.

The subject system accomplishes extraction of gray scale values from numeric color representation information. As will be appreciated from the description below, this separation is suitably accomplished at the color input level, at an intermediate level between the color space array and the color converter, or at the device color output level. For the reasons detailed below, it is particularly advantageous to extract grayscale information at the intermediate level, and via gray extraction system 24, as illustrated in FIG. 2.

Document imaging devices which are able to generate tonal values corresponding to more than one level are advantageously used such that a threshold value of an array is used completely between available output levels. In the subject system, a lower output of two possible values is chosen in the event an image input value is less than a selected threshold value. If an image value is greater than or equal to the threshold, a value which is higher of two output values is advantageously generated.

In determining a gray for particular color components, a determination is suitably made depending upon the location in a color conversion pipeline that a test determination is to be made. In an arbitrary three color system, components of which are suitably referred to as $C_1$, $C_2$ and $C_3$. A gray level is assumed to exist at a point where all components are assumed to be equal. However in this instance, a resultant gradation of gray level utilizing variations between the color components does not always hold true. This is particularly true for colors based on the CIE system described above. The subject invention is made in connection with the CIE color space. However, it is to be appreciated that any suitable color space, such as the International Color Consortium (ICC) space, Windows Color System (WCS) space, and the like, which is operable in a device independent profile connection space is suitable.

In a CIE color specification, the color space is typically converted by means of a color space array 20 into intermediate values, such as X, Y and Z values, such as illustrated in FIG. 2. Once so converted, it is then converted to a device specific output format such as red, green, blue (RGB); cyan, yellow and magenta, (CYM) or CYM with a black component, CYMK. This output, in turn, forms device color input to a rendering device as illustrated in FIG. 1. As noted above, it is to be appreciated that a determination of a suitable gray value is suitably performed at an input stage, prior to color space array 20, at an intermediate or XYZ stage as illustrated in FIG. 2 at gray extraction 24, or an output stage which is converted to a device dependent format after output of the color converter 22.

Considering the conversion option taken at the input stage, colors are suitably specified in a CIE based color space with a RGB type. Such gray levels are generally given by a condition wherein R=G=B, provided that input values have not been generated by a high precision calculation. In the event that image input is from a scanning device, or generated by a relatively low precision calculation, a definition of a gray color is not so easily defined. In some cases, a CIE color specification is made in a luminance-chrominance such as YCC (luminance Y, red chrominance $C_r$, blue chrominance, $C_b$), CIE L*u*v* (designed for emissive colors and to be perceptually uniform), CIE L*a*b, noted above, and the like. Therein, a gray criteria will resemble a format such as $C_2=C_3=0$ in order to define a gray having a value determined by the $C_1$ component. Other than in situations wherein an input CIE color space is predetermined or is limited to known spaces, a gray determination at an input color value is generally not practical for a general case.

In accordance with the foregoing, the subject invention teaches a conversion and extraction of a true gray value at an intermediate XYZ stage as illustrated in the preferred embodiment of FIG. 2. In a typical application, an intermediate stage is formed between a color space array and color rendering dictionary, as used as a color converter by an Adobe Systems PostScript rendering mechanism as will be appreciated by one or ordinary skill in the art. As noted above, it is to be appreciated that such conversions are suitably employed, such as International Color Consortium (ICC) conversion, Microsoft Windows Coloring System (WCS), or any system employing a color system path wherein an operation is suitably accomplished in a profile connection space (PCS).

Typically, a larger tolerance value is required insofar as an output of a multi-dimensional look-up table will not have precision to determine gray colors with sufficient accuracy. In the event that the color converter 22 incorporates a color-rendering dictionary that been constructed to include linearization and gray balance, that is, constructed from direct measurement data with linear transfer functions, then gray determination is not typically feasible at a color rendering dictionary output. This is attributed to the fact that equal amounts of toner or ink will not produce neutral gray and proportions of toner required to yield a gray are difficult to ascertain in advance for any particular printer.

A suitable color converter incorporates a color rendering dictionary to facilitate conversion from an XYZ space to a color palette associated with an associated output device. As noted above, the subject invention teaches gray extraction at this intermediate level, and is therefore accomplished between the color space array 20 and color converter 22. This extraction is completed at gray extraction mechanism 24, which receives multi-dimensional color information, such as XYZ. A modified multi-dimensional description, with gray scale information extracted therefrom, is defined as (XYZ). This modified value is communicated to a color converter 22 for conversion to a format associated with a selective output device.

Figure 3:
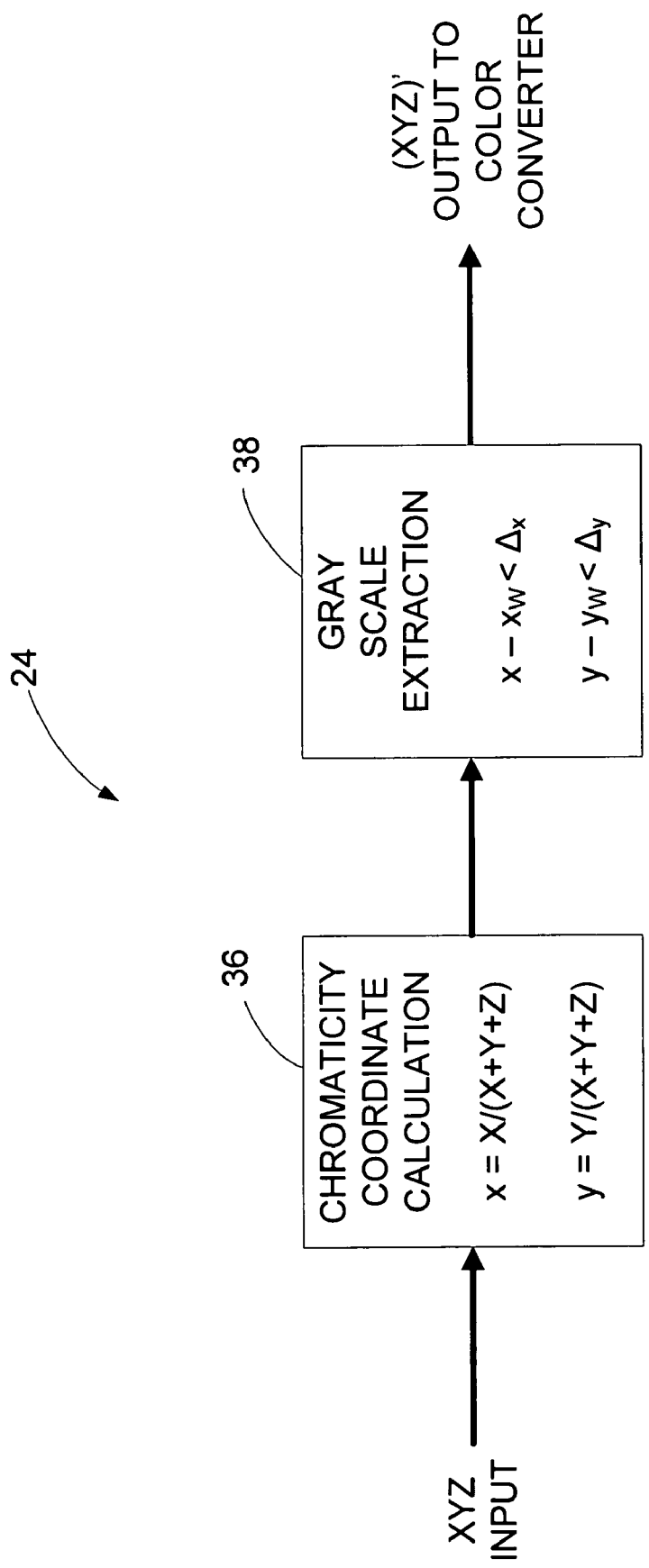
FIG. 3 is a flow diagram of a suitable gray isolation employed by the subject invention.

Turning to FIG. 3, a description of the gray extraction mechanism 24 is provided in greater detail. Gray isolation, as noted above, is completed at an intermediate stage between a color space array and a color converter, such as a color rendering dictionary in connection with a postscript embodiment. A color value in the CIE XYZ color space is referred to as a source illuminant.

In the diagram of FIG. 3, XYZ input values are communicated to the gray extraction mechanism 24. The subject system accomplishes its gray extraction based on chromaticity which is independent of brightness or lightness parameters. In the CIE, three-dimensional color space, a description is sometimes made via chromaticity space. Chromaticity components x, y and z are suitably derived by calculating fractional components of tristimulus values as:

$$x=X/(X+Y+Z);$$

$$y=Y/(X+Y+Z); \text{ and}$$

$$z=Z/(Z+Y+Z).$$

By definition, x+y+z=1. If two chromaticity components are known, than the third is redundant. Thus, all possible sets of tristimulus values are suitably represented in a two-dimensional plot. By convention, x and y are used.

In accordance with the forgoing, chromaticity values are first calculated in chromaticity coordinate calculation means 36 in accordance with two fractional components, suitably x and y, of tristimulus values $$x=X/(X+Y+Z); \text{ and}$$

$$y=Y/(Z+Y+Z).$$

The two fractional components x and y are then used in gray scale extraction means 38, wherein a single color gray scale value (XYZ)' is output for rendering. This gray scale extraction is calculated as:

$$x-x_w<\Delta_x; \text{ and}$$

$$y-y_w<\Delta_y.$$

The values $\Delta_x$ and $\Delta_y$ are selected tolerance values chose in connection with a desired output. They are suitably preselected or alternatively themselves a selected function of the Y value. The extraction mechanism advantageously replaces a multiple color gray rendition with that of a single color using a tolerance value and a chromaticity of a candidate color compared to a chromaticity of a defined illuminant.

It will be appreciated from the forgoing that the subject application teaches a system by which grayscale information is advantageously extracted from a multi-color representation. This affords an image rendering which has increased edge definition, and is more efficiently rendered than systems in which all available colors are utilized for gray color representation.

The invention extends to computer programs in the form of source code, object code, code intermediate sources and object code (such as in a partially compiled form), or in any other form suitable for use in the implementation of the invention. Computer programs are suitably standalone applications, software components, scripts or plug-ins to other applications. Computer programs embedding the invention are advantageously embodied on a carrier, being any entity or device capable of carrying the computer program: for example, a storage medium such as ROM or RAM, optical recording media such as CD-ROM or magnetic recording media such as floppy discs. The carrier is any transmissible carrier such as an electrical or optical signal conveyed by electrical or optical cable, or by radio or other means. Computer programs are suitably downloaded across the Internet from a server. Computer programs are also capable of being embedded in an integrated circuit. Any and all such embodiments containing code that will cause a computer to perform substantially the invention principles as described, will fall within the scope of the invention.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to use the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed:

1. A system for producing pure gray portions on a color image rendered on a multicolor document output device comprising:
    means adapted for storing image data inclusive of device independent color data having at least three color components, corresponding to an associated electronic document;
    means adapted for storing tolerance data representative of a selected range of the color data associated with at least one of the color components corresponding to gray coloration;
    means adapted for receiving chromaticity data;
    a processor and associated memory including gray conversion means adapted for generating single color grayscale data from the color data within the selected range in accordance with received chromaticity data wherein color data is outside of the selected range; and
    means adapted for generating an output image having both a grayscale portion and a color portion in accordance with the grayscale data and the color data outside of the selected range.

2. The system for producing pure gray portions on a color image rendered on a multicolor document output device of claim 1 further comprising means adapted for calculating the chromaticity data as a function of values of the at least three color components.

3. The system for producing pure gray portions on a color image rendered on a multicolor document output device of claim 2 wherein the gray conversion means further includes means adapted for generating the single color gray scale data in accordance with a comparison of the chromaticity data and defined chromaticity illuminant data.

4. The system for producing pure gray portions on a color image rendered on a multicolor document output device of claim 3 wherein the color components are represented by X, Y and Z, and wherein the means adapted for calculating chromaticity data includes means adapted for calculating chromaticity coordinates x and y as:

$x=X/(X+Y+Z)$; and $y=Y/(Z+Y+Z)$.

5. The system for producing pure gray portions on a color image rendered on a multicolor document output device of claim 4 wherein:
    the tolerance data includes at least two values $\Delta_x$ and $\Delta_y$;
    the defined chromaticity illuminant data includes at least two values $x_w$ and $y_w$; and
    the gray conversion means includes means adapted for generating the signal color grayscale data in as, $x-x_w<\Delta_x$; and $y-y_w<\Delta_y$.

6. The system for producing pure gray portions on a color image rendered on a multicolor document output device of claim 1 wherein the gray conversion means includes at least one of a color rendering dictionary and profile connection space.

7. A method executable in system including a processor, an associated memory and gray conversion means, for producing pure gray portions on a color image rendered on a multicolor document output device comprising the steps of:
    receiving device independent color data having at least three color components, corresponding to an associated electronic document;
    receiving tolerance data representative of a selected range of the color data associated with at least one of the color components corresponding to gray coloration;
    receiving chromaticity data;
    generating, by the gray conversion means, single color grayscale data from the color data within the selected range in accordance with received chromaticity data wherein color data is outside of the selected range; and
    generating an output image having both a grayscale portion and a color portion in accordance with the grayscale data and the color data outside of the selected range.

8. The method for producing pure gray portions on a color image rendered on a multicolor document output device of claim 7 further comprising the step of calculating the chromaticity data as a function of values of the at least three color components.

9. The method for producing pure gray portions on a color image rendered on a multicolor document output device of claim 8 wherein the step of generating grayscale data further comprises the step of generating the single color gray scale data in accordance with a comparison of the chromaticity data and defined chromaticity illuminant data.

10. The method for producing pure gray portions on a color image rendered on a multicolor document output device of claim 9 wherein the color components are represented by X, Y and Z, and wherein step of calculating chromaticity data includes the step of calculating chromaticity coordinates x and y as:

$x=X/(X+Y+Z)$; and $y=Y/(Z+Y+Z)$.

11. The method for producing pure gray portions on a color image rendered on a multicolor document output device of claim 10 wherein:
    the tolerance data includes at least two values $\Delta_x$ and $\Delta_y$;
    the defined chromaticity illuminant data includes at least two values $x_w$ and $y_w$; and
    the step of generating grayscale data further comprises the step of generating the signal color grayscale data in as, $x-x_w<\Delta_x$; and $y-y_w<\Delta_y$.

12. The method for producing pure gray portions on a color image rendered on a multicolor document output device of claim 7 wherein step of generating grayscale data includes at least one of a color rendering dictionary and profile connection space.

13. A computer-implemented method executable in system including a processor, an associated memory and gray conversion means for producing pure gray portions on a color image rendered on a multicolor document output device comprising the steps of:
- receiving device independent color data having at least three color components, corresponding to an associated electronic document;
- receiving tolerance data representative of a selected range of the color data associated with at least one of the color components corresponding to gray coloration;
- receiving chromaticity data;
- generating the gray conversion means single color grayscale data from the color data within the selected range in accordance with received chromaticity data wherein color data is outside of the selected range; and
- generating an output image having both a grayscale portion and a color portion in accordance with the grayscale data and the color data outside of the selected range.

14. The computer-implemented method for producing pure gray portions on a color image rendered on a multicolor document output device of claim 13 further comprising the step of calculating the chromaticity data as a function of values of the at least three color components.

15. The computer-implemented method for producing pure gray portions on a color image rendered on a multicolor document output device of claim 14 wherein the step of generating grayscale data further comprises the step of generating the single color gray scale data in accordance with a comparison of the chromaticity data and defined chromaticity illuminant data.

16. The computer-implemented method for producing pure gray portions on a color image rendered on a multicolor document output device of claim 15 wherein the color components are represented by X, V and Z, and wherein step of calculating chromaticity data includes the step of calculating chromaticity coordinates x and y as:

$x=X/(X+Y+Z)$; and $y=Y/(Z+Y+Z)$.

17. The computer-implemented method for producing pure gray portions on a color image rendered on a multicolor document output device of claim 16 wherein:
- the tolerance data includes at least two values $\Delta_x$ and $\Delta_y$;
- the defined chromaticity illuminant data includes at least two values $x_w$ and $y_w$; and
- the step of generating grayscale data further comprises the step of generating the signal color grayscale data in as, $x-x_w<\Delta_x$; and $y-y_w<\Delta_y$.

18. The computer-implemented method for producing pure gray portions on a color image rendered on a multicolor document output device of claim 13 wherein step of generating grayscale data includes at least one of a color rendering dictionary and profile connection space.

* * * * *

UNITED STATES PATENT AND TRADEMARK OFFICE
CERTIFICATE OF CORRECTION

| | | |
|---|---|---|
| PATENT NO. | : 7,656,414 B2 | Page 1 of 1 |
| APPLICATION NO. | : 11/399041 | |
| DATED | : February 2, 2010 | |
| INVENTOR(S) | : Ronald J. Pellar | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 785 days.

Signed and Sealed this

Twenty-eighth Day of December, 2010

David J. Kappos
*Director of the United States Patent and Trademark Office*